United States Patent

Stoliar et al.

Patent Number: 5,131,178
Date of Patent: Jul. 21, 1992

[54] INSECT NET

[76] Inventors: Arthur P. Stoliar; Joan Stoliar, both of 46 Jane St., New York, N.Y. 10014

[21] Appl. No.: 529,616
[22] Filed: May 29, 1990
[51] Int. Cl.⁵ .......................................... A01K 77/00
[52] U.S. Cl. ....................................................... 43/12
[58] Field of Search .................. 43/110, 133, 134, 135, 43/12

[56] References Cited

U.S. PATENT DOCUMENTS

| | | | |
|---|---|---|---|
| 1,957,944 | 5/1934 | Dexter | 43/12 |
| 2,491,703 | 12/1949 | Bell | 43/12 |
| 2,637,133 | 5/1953 | Ross | 43/12 |
| 2,739,403 | 3/1956 | Kalmus | 43/12 |
| 2,984,038 | 5/1961 | Chapralis | 43/12 |
| 4,050,177 | 9/1977 | Gerritsen | 43/12 |
| 4,139,961 | 2/1979 | Markos | 43/12 |
| 4,207,700 | 6/1980 | Marleau | 43/12 |
| 4,263,864 | 4/1981 | Carter, Jr. | 43/12 |

Primary Examiner—Kurt Rowan
Attorney, Agent, or Firm—Seymour Levine

[57] ABSTRACT

A net for capturing and observing objects includes a pouch of netting material, spring arms which support the pouch and automatically opens an aperture, through which the object may pass for capture, when released from a slot in a mechanism which supports the spring and net. A telescoping handle coupled to the support mechanism adjusts the distance at which objects may be captured.

14 Claims, 3 Drawing Sheets

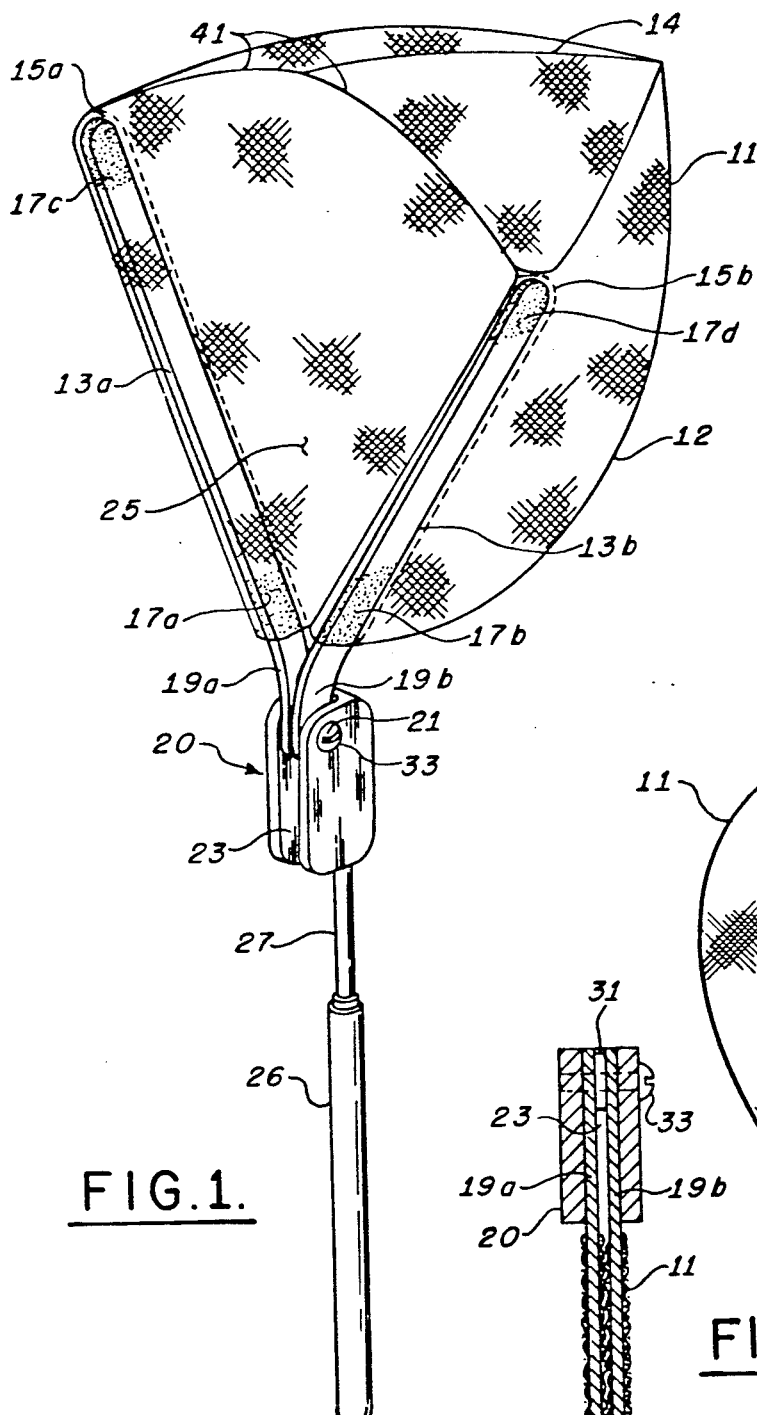
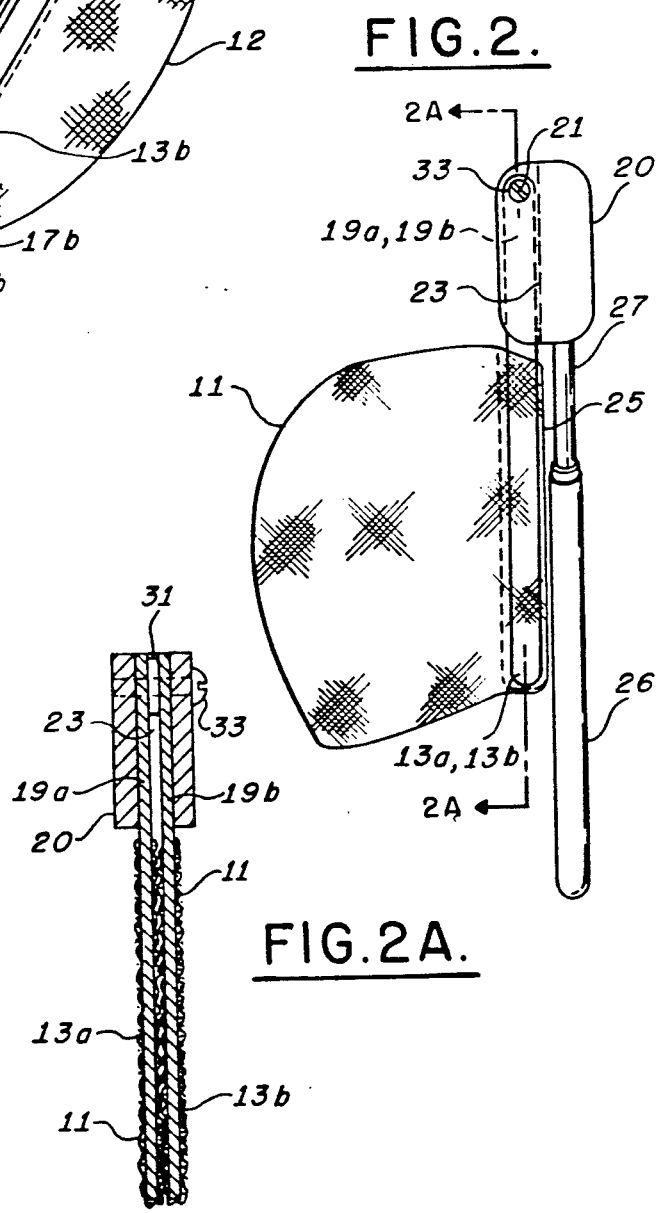

INSECT NET

BACKGROUND OF THE INVENTION

Sport fishing is rooted in antiquity. Even when his existence depended upon success in catching fish, man found pleasure in that pursuit. Early man saw the advantage of using a rod (stick or branch) which allowed him to reach over river banks to where the fish were located, thus giving the name of angling to sport fishing.

One of the basic methods of angling which has been practiced for thousands of years is fly-fishing. In fly-fishing an artificial fly, insect or imitation of other natural food is used to lure the fish. In Roman times it was written of how the Macedonians caught trout on artificial flies.

The history of fishing as a sport is said to have really started with the printing at Westminster by Wynkyn de Wrode in 1496 of the "Treatyse of Fysshynge Wyth an Angle", thought to have been written by Dame Juliana Berners.

In fact six of the dozen artificial flies mentioned in the "Treatyse" are still in use.

The artificial fly is presented to the fish by means of a flexible rod and a thick, heavy line for casting weight. The lines are tapered, with the end nearest the fly made very fine to allow a delicate presentation. Attached to the end of the line is a section of nylon monofilament (called a leader) which may also be tapered throughout its length. The fly or flies are attached to the end of the leader. The artificial fly is cast by a combination of the springlike action of the rod and the weight of the line.

There are a number of different methods of fly-fishing but broadly they are based on the behavior of certain insects that spend most of their life in the water but have a short life in the air close to the lake or river.

The most important species of flies to the fly-fisher are the up-winged or mayflies (Ephemeroptera), the caddis or sedge flies (Tricoptera) and the midges (Diptera). All these flies spend most of their life in the water as nymphs, grubs, and pupae and form a substantial part of the diet of trout and other insectivorous fish. At the appropriate time of the year they swim to the surface, where they shed their underwater skins and emerge as winged insects. They remain on the surface of the water until their wings are strong enough, then they fly to dry land. Mating takes place in the air. The females later return to the water to lay their eggs either in or on it.

Trout feed on these insects during all the stages when the insect is available to them, and the angler seeks to imitate their appearance and behavior in order to deceive his quarry. He is therefore either fishing his artificial fly in the water at various levels, known as nymph fishing or wet fly fishing, or on the surface, known as dry fly fishing.

It is often difficult to identify the fly which is hatching, since its shape, size and coloration may be obscure when seen at a distance. To facilitate identification the fisherman tries to capture the insect that he desires to imitate, preferably without harming it.

In the prior art this has been done with bulky nets that are burdensome to carry. Often the insect escapes from these nets before it has been inspected. Another device in the prior art for capturing insects utilizes two rigid flaps which may be folded together to capture the insect therebetween. This device usually damages the insect. Further it must be operated in the proximity of the insect giving it an appreciable warning of imminent danger, thereby providing the insect with a fair chance to avoid capture.

It is an object of this invention to provide a net that is easily carried and allows harmless capture of an insect at a distance.

SUMMARY OF THE INVENTION

In accordance with the present invention a net for the harmless capture of airborne or waterborne insects and for permitting inspection of a captured insect without allowing it to escape includes a pouch formed with netting material attached to a pair of spring arms, these spring arms automatically open an aperture of the pouch when sections of the springs are pivotally released from a slot in a support block. When an insect is snared in the netting material the aperture may be closed to capture the insect unharmed by pivoting the springs to position the section in the slot. A telescoping handle attached to the end opposite the pivot end provides a variable capture distance.

BRIEF DESCRIPTION OF THE DRAWINGS

FIG. 1 is a sketch of the invention showing an open aperture pouch for snaring an insect.

FIG. 2 is a sketch of the invention showing a closed aperture for capturing a snared insect.

FIG. 2A is a view showing the closed aperture through the cross-section A—A indicated in FIG. 2.

DESCRIPTION OF THE PREFERRED EMBODIMENTS

Figure 3:
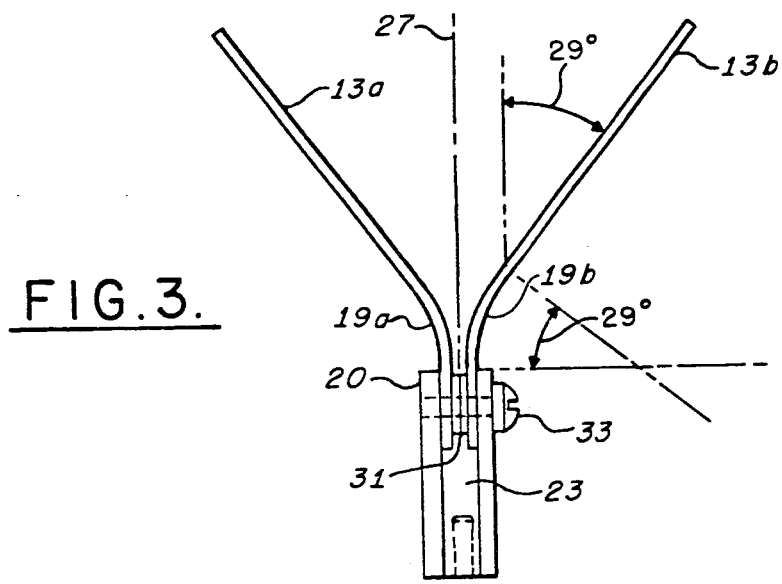
FIG. 3 is an illustration of a support springs and a retaining slot, indicating thereon the dimension utilized in a preferred embodiment of the invention.

Refer to FIG. 1 wherein an illustration of a preferred embodiment, generally indicated at 10, is shown. A pouch 11 constructed of net material is attached to spring arms 13a, 13b by means of folding the net material and stitching to establish sleeves 15a, 15b into which the spring arms are inserted. The net material may be glued to the spring arms at the ends of the sleeves for a short distance 17a, 17b, and 17c 17d with an appropriate gluing material. The glued areas 17a, 17b, at the base of the sleeve, do not overlap bent areas 19a and 19b of the spring arms 13a and 13b, respectively. Spring arms 13a, 13b are attached to a block 20 for pivoting about a pivot point 21 so that the bent sections 19a, 19b of the springs may be inserted and removed from a slot 23. When the spring arms are removed from the slot 23, an aperture 25 of the pouch is opened through which an insect may pass to be snared in the netting material of the pouch 11. After an insect has been snared the spring arms may be reinserted in the slot to close the aperture, thereby capturing the insect unharmed in the pouch 11. The telescoping handle 26 attached to the support block 20, allows the user to snare and capture insects at varying distances from the user's location.

Though in FIG. 1 the aperture is shown open at an angle of 90° with respect to the top of the support block 20, it should be recognized that the aperture 25 is fully open when the bent sections 19a, 19b are completely removed from the slot 23.

The depth of the slot, width of the spring arms, length of the bent ends of the spring arms, and location of the pivot point all combine to limit the angle through which the spring arms can be rotated so that the spring arms axis of symmetry is parallel to the handle 26 when the net is fully open and fully closed.

FIG. 2 illustrates the position of the support springs 13a, 13b relative to the telescoping handle 26 when the bent sections of the springs 19a, 19b are completely inserted in the slot 23 to close the aperture 25 of the pouch 11. In this position the spring arms 13a, 13b are held substantially together and are parallel to the handle 26. This parallel relationship and the closed aperture are clearly shown in FIG. 2A, which is the view through the cross section A—A shown in FIG. 2. In FIG. 2 and subsequent figures, like elements bear the same reference numeral designations.

Referring again to FIG. 1, the pouch 11 is constructed of a woven springy material, such as Sparkle Illusion White No. 880/108 manufactured by Novick & Company Inc. of New York, N.Y.. This material maintains its shape when unfolded and provides an open area between the open aperture and the netting material. This material has a neutral color and a relatively open weave to allow observation of the captured insect. Further, the material will not unravel, thus minimizing the number of bounded edges.

Refer now to FIG. 3 wherein an assembly of the spring arms 13a, 13b and the support block 20 is shown. The spring arm 13a, 13b may be constructed of clock spring steel or other material with a very high yield stress and extend linearly from a bend at an angle of 29° relative to the center line 27 of the assembly. The spring bends 19a, 19b may be completed over an arc length of approximately 0.75 inches to inscribe an arc of about 29° from the top of the support block 20 to the beginning of the linear section of the spring arms. Disc springs 31, which may be Belleville washers, are inserted between the spring arm bend sections 19a, 19b in the slot area 23. The spring arms 13a, 13b pivot about a threaded bolt 33 which threads into tap sections of the support block 20 on either side of the slot 23 and passes through the disc springs 31. This design provides a constant friction for holding the spring arms in place in either the open or closed position. The friction is determined by the disc springs 31 positioned between the spring arm bend 19a, 19b. Because the screw 33 is threaded into the two tapped holes in the support block 20 on either side of the slot 23 it cannot change the width of the slot and therefore has no effect on the friction applied to the spring arms.

Figure 4:
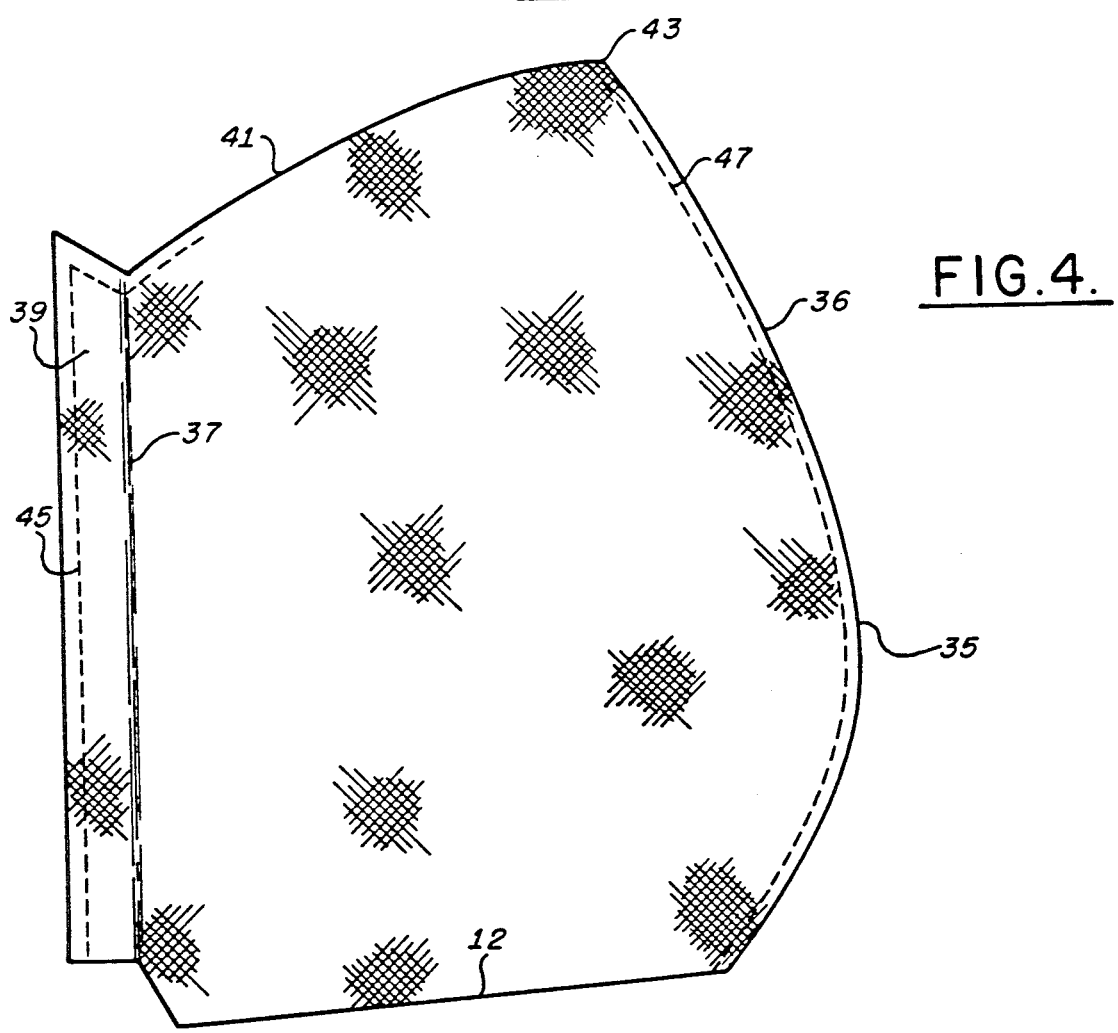
FIG. 4 is an illustration of a pattern which may be utilized for constructing the pouch of a preferred embodiment of the invention.

A pattern for constructing the pouch 11 is shown in FIG. 4. The netting material is folded along a straight line having a slope of 5/64 for a distance of four inches from the end of the fold, indicated as 12 in FIGS. 1 and 4, the material is cut along a suitable curve, such as a parabola or hyperbola in a manner to provide a distance of 5 and 3/16 inches between the apex 35 of the curve and a fold 37. The material is further cut to provide a flap 39 having a length extending from the fold of approximately ⅛ inch. The material is still further cut along a slightly curving arc 41 which intersects with the curve 36 at a point 43 which is approximately 3 and 7/16 inches from the fold 37. After the cuts have been made the material is in two sections about the fold 12. Flap 39 in each section is then stitched along the lines 45 (shown dotted on the Figure) to establish the sleeves 15a and 15b shown in FIG. 1. Additional stitching is performed along the line 47 (shown as a dotted line) parallel to the curve 36. It should now be apparent that the stitching 47 along the curve 36 establishes the stitched portion of the net 14 shown in FIG. 1 while the aperture 25 is defined by the sleeves 15a and 15b, established by stitching the folds 39 and the slightly arcing edge 41 on either side of the stitch line 14.

Figure 5A:
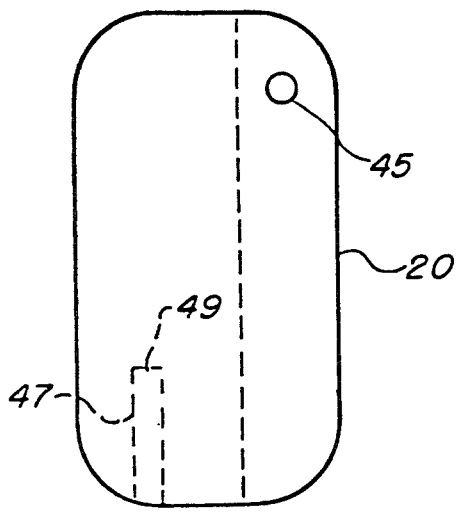
FIGS. 5A through 5E are drawings of support blocks of preferred embodiments of the invention.
Figure 5B:
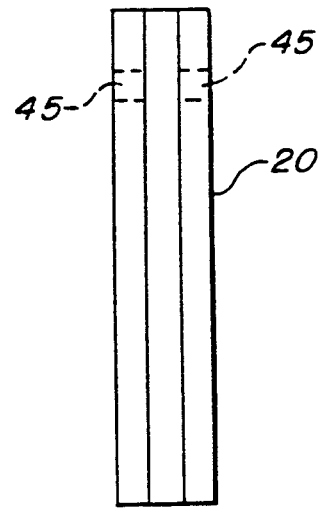
Figure 5C:
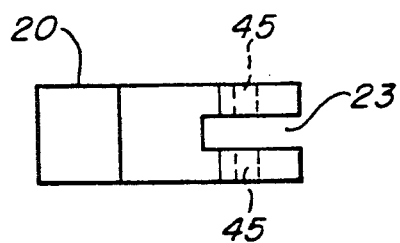

Views of a support block 20 made from a solid metal piece are shown in FIGS. 5A through 5C. The dimensions of the support block may be as shown in the figures. Holes 45 on either side of the slot 23 are both tapped through so that a screw 33, which captures the spring arms 13a, 13b and the disc springs 31 threaded through the two tapped holes cannot change the width of the slot. Frictional forces on the spring arms, for this construction, is determined solely by the disc springs. A tapped hole 47 is provided for coupling the telescoping handle 26 to the support block. As shown in FIG. 5E, this tapped hole may be ⅜ inches deep with the tap extending for ¼ of an inch from the end 49 of the hole and the upper ⅛ of an inch being counter bored to provide a slip fit for the inner rod 27 of the telescoping handle 26 which is screwed in to the support block. The inner rod is tapped over a length of ¼ inch so that the thread terminus is maintained in the hole.

Figure 5D:
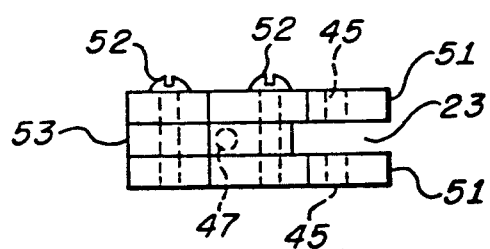
Figure 5E:
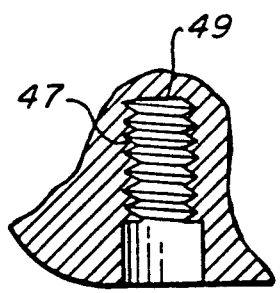

Referring now to FIG. 5D, wherein a three piece construction for the support block is shown. Two sections 51 of the support block are joined by bolts 52 with a spacer section 53 therebetween. The spacer section 53 is of a length less than the two sections 51 so that the assembly provides the slot 23. A tapped hole 45 is provided in each of the sections 51 to accept the screw 33 and the tapped hole 47 is provided in the spacer section 53 to accept the inner rod of the telescoping handle 26. After assembly the three section block of FIG. 5D will have the dimensions as shown in FIG. 5A and 5B and the assembly of the insect net proceeds as previously described.

While the invention has been described in its preferred embodiments, it is to be understood that the words which have been used are words of description rather than of limitation and that changes within the purview of the appended claims may be made without departure from the true scope and spirit of the invention in its broader aspects.

We claim:

1. An apparatus comprising:
   a net having first and second sleeves, a pouch and an aperture for said pouch;
   first and second springs each having a straight section inserted into said first and second sleeves, respectively, and a bent section respectively extending beyond said first and second sleeves; and
   means for pivotally supporting and controlling said first and second springs, said means having a pivot whereat said first and second springs are coupled to said supporting and controlling means for rotation about said pivot, said supporting and controlling means further including a slot positioned in such manner that rotation of said first and second springs about said pivot insert and remove said bent section of said first and second springs from said slot causing said first and second springs to cooperatively close and open said aperture.

2. The apparatus of claim 1 wherein said supporting and controlling means contains a tapped hole on either side of said slot and a screw, said screw extending through holes in said first and second springs screwed into each tapped hole so that said first and second springs may pivot about said screw.

3. The apparatus of claim 2 further including at least one disc spring positioned in said slot and mounted on said screw.

4. The apparatus of claim 3 wherein said disc springs are Belleville washers.

5. An apparatus in accordance with claim 1 wherein said supporting means includes means for attaching a handle.

6. An apparatus in accordance with claim 5 wherein said attaching means includes a hole having an untapped section extending a preselected length from a base of said supporting means to an end and a tapped section extending said untapped section to said end, said untapped section having a diameter to provide a slip fit for a threaded end of said handle.

7. An apparatus in accordance with claim 6 further including a telescoping handle having an innermost rod with tapped end for threaded into said tapped section.

8. An apparatus in accordance with claim 7 wherein an axis of symmetry of said spring means is parallel to said handle when said aperture is fully open and fully closed.

9. An apparatus comprising:
net means having first and second sleeves, a pouch and an aperture for said pouch;
spring means having first and second springs respectively inserted into said first and second sleeves for opening and closing said aperture; and
means for pivotally supporting and controlling said spring means, said supporting and controlling means including:
first and second sections of equal length having first and second tapped holes respectively, said tapped holes having equal threads; and
a spacer, having a length less than said equal length, positioned between said first and second sections to establish a slot with said tapped holes in alignment on either side of said slot.

10. The apparatus of claim 9 wherein said supporting means contains a screw extending through holes in said first and second springs and threaded into each tapped hole so that said first and second springs may pivot about said screw.

11. The apparatus of claim 10 wherein said controlling means includes at least one disc spring positioned in said slot and mounted on said screw.

12. The apparatus of claim 11 wherein said disc springs are Belleville washers.

13. The apparatus of claim 9 wherein said spacer section contains a tapped hole with a countersunk region to provide a slip fit for a threaded section of a handle in said counterbored region.

14. An apparatus in accordance with claim 13 further including a telescoping handle having an innermost rod with a tapped end threaded into said tapped section.

* * * * *